(12) United States Patent
Ahmed et al.

(10) Patent No.: US 7,617,322 B2
(45) Date of Patent: Nov. 10, 2009

(54) SECURE PEER-TO-PEER CACHE SHARING

(75) Inventors: Khaja E. Ahmed, Redmond, WA (US); Daniel R. Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 11/540,435

(22) Filed: Sep. 29, 2006

(65) Prior Publication Data
US 2008/0082648 A1 Apr. 3, 2008

(51) Int. Cl.
G06F 15/173 (2006.01)
(52) U.S. Cl. .................. 709/229; 709/225
(58) Field of Classification Search ............. 709/229, 709/217
See application file for complete search history.

(56) References Cited

U.S. PATENT DOCUMENTS

| | | | |
|---|---|---|---|
| 6,349,368 | B1 | 2/2002 | Arimilli et al. |
| 6,542,964 | B1 | 4/2003 | Scharber |
| 6,912,622 | B2 | 6/2005 | Miller |
| 7,010,578 | B1 | 3/2006 | Lewin et al. |
| 7,089,301 | B1 | 8/2006 | Labio et al. |
| 2002/0112125 | A1 | 8/2002 | Copeland et al. |
| 2004/0044727 | A1* | 3/2004 | Abdelaziz et al. ........... 709/203 |
| 2005/0100166 | A1* | 5/2005 | Smetters et al. ............ 380/277 |
| 2005/0129240 | A1* | 6/2005 | Balfanz et al. .............. 380/270 |
| 2005/0235043 | A1 | 10/2005 | Teodosiu et al. |
| 2006/0107100 | A1 | 5/2006 | Hayward |
| 2006/0117026 | A1 | 6/2006 | Kaler et al. |
| 2006/0168318 | A1 | 7/2006 | Twiss |
| 2007/0124247 | A1* | 5/2007 | Pinkas et al. ................... 705/50 |
| 2008/0147778 | A1* | 6/2008 | Ushiyama et al. ........... 709/202 |

OTHER PUBLICATIONS

Aberer, "Peer-2-Peer Systems," Date:2002, http://lsirwww.epfl.ch/courses/dip/2002ws/week%209%20P2P%20part1.pdf.
Dyrna, "Peer2Peer Network Service Discovery for Adhoc Networks," Date:Nov. 12, 2003, http://www13.infomatik.tumuenchen.de/lehre/seminare/WS0304/UB-hs/Dyrna ServiceDiscovery final.ndf.
Mantratzis, et al., "Towards a Peer2Peer World-Wide-Web for the Broadband-enabled User Community," Date: Oct. 15, 2004, p. 42-49, http://delivery.acm.org/10 1145/1030000 /1026442/n42-mantratzis ndf.

* cited by examiner

*Primary Examiner*—Salad Abdullahi
(74) *Attorney, Agent, or Firm*—Hope Baldauff Hartman, LLC

(57) ABSTRACT

A system, apparatus, method, and computer-readable medium are provided for secure P2P caching. In one method, a requesting peer obtains a hash of requested data from a server. The requesting peer then transmits a request for the data to other peers. The request proves that the requesting peer has the hash. If a caching peer has the data, it generates a reply to the request that proves that it has the requested data. If the requesting peer receives a reply from a caching peer, the requesting peer establishes a connection to the caching peer and retrieves the data from the caching peer. If the requesting peer does not receive a reply to the request from any other peer, the requesting peer establishes a connection to the server and retrieves the data from the server. The requesting peer stores the data for use in responding to requests from other peers.

20 Claims, 7 Drawing Sheets

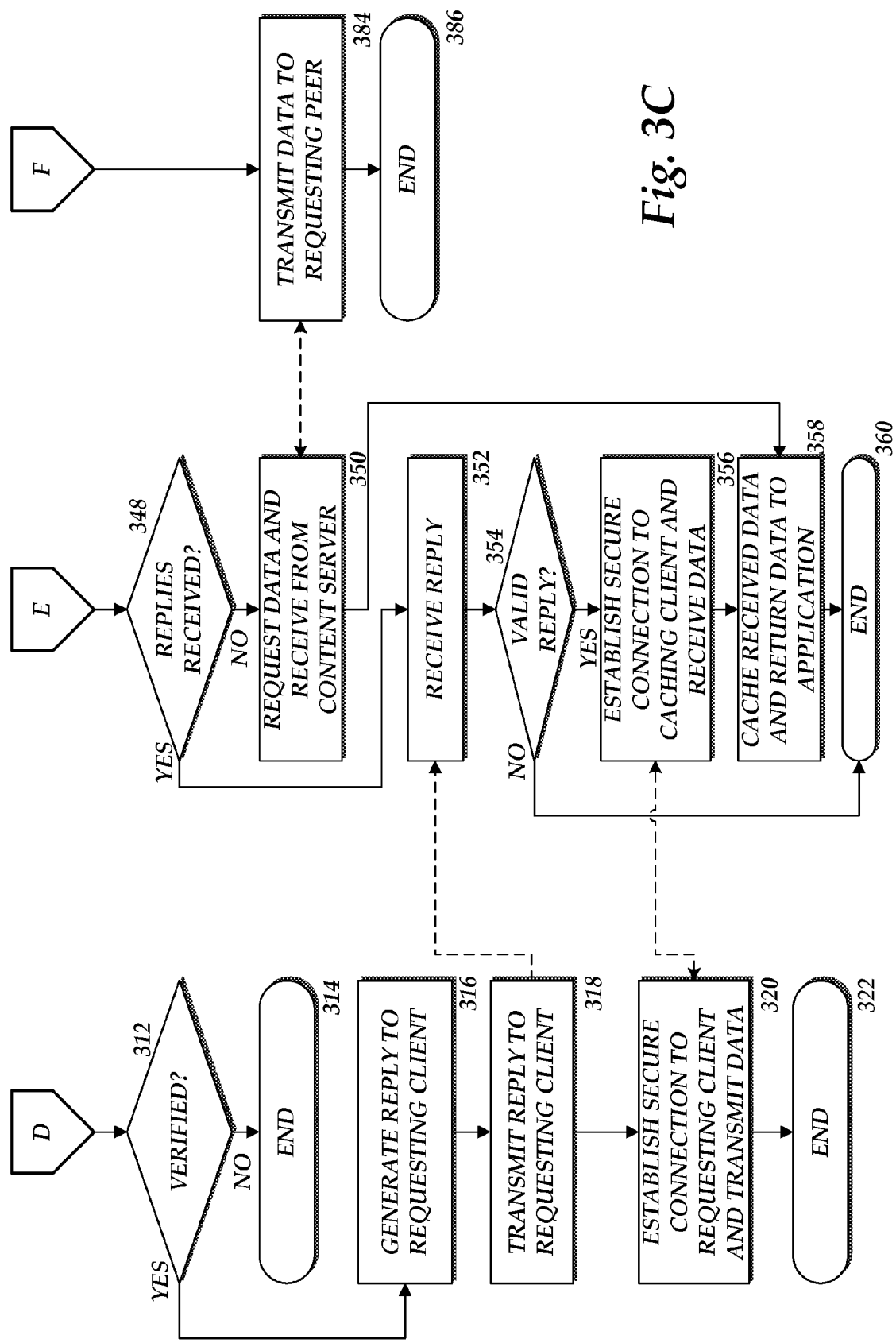

SECURE PEER-TO-PEER CACHE SHARING

BACKGROUND

As a result of economic globalization, many enterprises operate a main corporate office along with many remote office sites, called branch offices. In order to provide network connectivity between all of the offices of an enterprise, a wide area network ("WAN") is typically utilized. A WAN is a computer network that covers a wide geographic area and that may include many computers operating in different geographic locations. For instance, a company based in the Western hemisphere may utilize a WAN to provide connectivity to branch offices located in the Eastern hemisphere.

A large portion of the information technology ("IT") budgets of corporations around the world is expended on establishing and maintaining the technology in and network connectivity of branch offices. In particular, a large portion of these budgets is expended on the purchase and maintenance of WAN links to branch offices. The trend toward globally disbursed offices is expected to increase the use of WANs along with the associated costs to enterprise. As a result, it is generally desirable to improve WAN utilization in order to reduce WAN maintenance costs.

Various technologies are currently utilized to maximize WAN utilization and thereby reduce the associated WAN link costs. For instance, technologies like data compression, quality of service ("QoS"), traffic shaping, transmission control protocol ("TCP") optimization, wide area file services ("WAFS"), caching, and others may be utilized to maximize WAN utilization. In many cases, these technologies are aggregated into a network appliance that resides at each branch office. Unfortunately, these devices are often expensive and also require administrative supervision that may not be available at a branch office. More troubling, however, is the fact that these current solutions do not operate well in environments where end-to-end security is necessary.

It is with respect to these considerations and others that aspects of a method, system, apparatus, and computer-readable medium for secure peer-to-peer ("P2P") cache sharing are described herein.

SUMMARY

A system, apparatus, method, and computer-readable medium are provided herein for secure P2P cache sharing. According to one aspect of the disclosure provided herein, the utilization of a network link is maximized by securely caching data at peer computers. Because the caching described herein is performed below the application layer of the network stack, the caching process does not require a costly network appliance, modification of client or server application programs, or additional administrative support.

According to one method described herein, peer computers operating within a P2P network include a cache manager program. The cache manager program executes in conjunction with a network protocol stack on the peer computers and acts as a proxy for application protocol data requests. In response to receiving such a request, the cache manager is operative to contact a server computer to retrieve a hash value (also referred to herein as a "hash") for the requested data. A hash value is the result of the application of a hash function to the requested data. The server computer will only provide the hash value for the requested data when the requesting peer computer on which the cache manager is executing has the appropriate access rights to the data. For instance, the server computer may check an access control list ("ACL") for the requested data or perform another type of security check before providing the hash value for the requested data to the cache manager.

Once the cache manager has obtained the hash value for the requested data, the cache manager transmits a broadcast request for the data to other peer computers on the network. The broadcast request allows the requesting computer to determine whether another peer computer, called the caching peer computer, has the requested data. The broadcast request includes data sufficient to prove that the requesting peer has possession of the hash value for the requested data. Because possession of the hash value for the requested data implies the right to possession of the requested data itself, this is accomplished without transmitting the hash value for the requested data.

In one implementation, the broadcast request includes a hash of the hash value for the requested data, random data generated by the requesting peer computer, and an identifier for the requesting peer computer. In this implementation, the broadcast request also includes a hash of the hash value for the requested data concatenated with the random data generated by the requesting peer, a timestamp, and the identifier for the requesting peer computer. Utilizing the data contained in the broadcast request, the cache manager executing on other peer computers can determine whether the requesting peer computer is actually in possession of the hash value for the requested data. The data in the broadcast request also assists the other peer computers in determining whether they are in possession of the requested data.

If a cache manager executing on another peer computer determines that the requesting peer computer is in possession of the hash value for the requested data and that it has the requested data, the cache manager executing on the caching peer computer generates a reply to the request. The reply contains data sufficient to prove possession of the requested data by the caching peer computer without transmitting the hash value for the requested data. In particular, according to one implementation, the reply contains a hash of the hash value for the requested data along with random data generated by the caching peer computer. The reply also contains a hash of the hash value for the requested data concatenated with the random data generated by the caching peer computer, the identifier for the requesting peer computer, an identifier for the caching peer computer, and the timestamp.

If the requesting peer computer receives a reply to the request from a caching peer computer, the cache manager executing on the requesting peer computer utilizes the contents of the reply to determine whether the caching peer computer actually possesses the requested data. If so, the requesting peer computer establishes a secure network connection to the caching peer computer and retrieves the requested data from the caching peer computer over the secure connection. If the requesting peer computer does not receive a reply to the request from any other peer computer, the requesting peer computer establishes a connection to the server computer from which it obtained the hash and retrieves the requested data from the server computer.

Once the requesting peer computer has obtained the requested data, either from another peer computer or from the server computer, the requesting peer computer may store the requested data in a cache and index the data using a hash of the hash value for the requested data. The peer computer can then utilize the stored data to respond to requests from other peer computers for the data. In this manner, each peer computer acts as both a requesting peer computer and a caching peer computer.

The above-described subject matter may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3A-3C are flow diagrams showing aspects of illustrative processes for securely caching data in a P2P network discussed herein;

DETAILED DESCRIPTION

Figure 1:
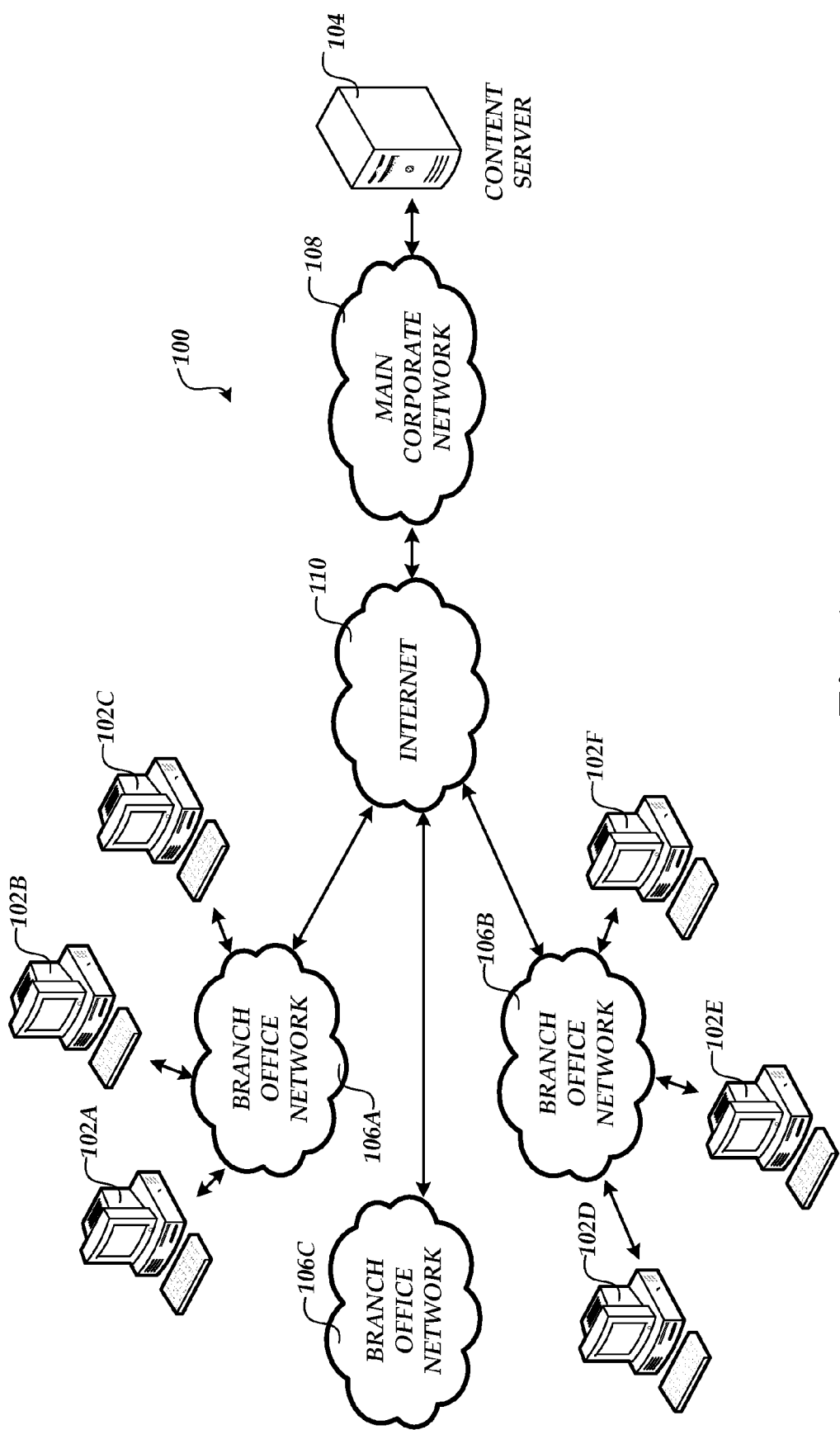
FIG. 1 is a network diagram showing an illustrative operating environment for the processes and computer systems described herein.

The following detailed description is directed to systems, methods, and computer-readable media for secure P2P cache sharing. While the subject matter described herein is presented in the general context of program modules that execute in conjunction with the execution of an operating system and application programs on a computer system, those skilled in the art will recognize that other implementations may be performed in combination with other types of program modules. Those skilled in the art will also recognize that the software components described herein may also be implemented in hardware, such as through the use of application specific integrated circuits ("ASICs"), field-programmable gate arrays ("FPGAs"), custom hardware, or other types of hardware devices.

As described herein, program modules generally include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like. The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for secure P2P cache sharing will be described.

FIG. 1 shows aspects of an illustrative operative environment for the subject matter described herein. In particular, FIG. 1 is a network diagram illustrating aspects of a computing network 100 that forms an operating environment for the computing systems and processes described herein. As shown in FIG. 1, the network 100 comprises a WAN for connecting a content server 104 to a multitude of peer computers 102A-102F (also referred to herein as "peers," "nodes," or "clients") and for connecting the peer computers 102A-102F to one another.

The network architecture shown in FIG. 1 is a typical network architecture utilized by businesses to connect a main corporate campus or office and multiple remote locations or branch offices. It should be appreciated, however, that the network environment shown in FIG. 1 is merely illustrative and that the implementations described herein may be utilized to securely transfer data between computer systems operating in any type of network environment. As a result, the network architecture shown in FIG. 1 and described herein should be considered merely illustrative and not limiting in any fashion.

The WAN illustrated in FIG. 1 includes a main corporate network 108 to which the content server 104 is directly connected. The main corporate network 108, in turn, is connected to a distributed public computing network, such as the Internet 110. The branch office networks 106A-106C are also connected to the Internet 110. The branch office networks 106A-106C are local area networks ("LANs") suitable for locally connecting two or more computer systems. For instance, the peer computers 102A-102C are connected to the branch office network 106A and the peer computers 102D-102F are connected to the branch office network 106B. It should be appreciated that more or fewer branch office networks may be utilized than shown in FIG. 1 and that more or fewer peer computers may be connected to each branch office network. It should also be appreciated that other networks not shown in FIG. 1 may be utilized to complete the network path between the peer computers 102A-102F and to the content server 104.

According to implementations described herein, the peer computers 102A-102F are operative to create a P2P networking system. A P2P networking system is a network that relies primarily on the computing power, bandwidth, and storage of participants in the network rather than concentrating it in a relatively low number of servers. As will be described in greater detail below, the P2P networking system created by the peer computers 102A-102F is operative to cache data at some or all of the peers 102A-102F, and to provide the cached data to other peer computers in a secure manner. In this way, data retrieved from the content server 104 over the WAN can be cached within a branch office network. At the time of a subsequent request for the data from one of the peer computers 102A-102F, the cached data is utilized rather than again retrieving the data from the content server 104 over the WAN.

In this manner, the amount of network traffic sent over the WAN is reduced. Additional details regarding this process are provided below with respect to FIGS. 2-5.

Each of the peer computers 102A-102F illustrated in FIG. 1 comprises a standard desktop, laptop, handheld, server, or other type of computer system. As will be discussed in detail below, each of the peer computers 102A-102F includes a cache manager program that coordinates the process of securely caching data at the peer computers 102A-102F, and of retrieving requested data from the P2P cache or from the content server 104 as necessary. Additional details regarding the software and hardware utilized in the peer computers 102A-102F and their operation will be provided below with respect to FIGS. 2-5.

The content server computer 104 illustrated in FIG. 1 comprises a standard server computer operative to receive and respond to requests from the peer computers 102A-102F for content stored at or available to the content server 104. The content may comprise any type of digital data, including but not limited to electronic mail ("e-mail") messages, data files stored at the content server 104 or elsewhere, Web pages stored at the content server 104 or on the Internet 110, personal information manager ("PIM") data such as calendar events, contacts, tasks, or notes, or other types of data. As will be described in greater detail below, the content server 104 assists in the caching of data at the peer computers 102A-102F by providing hash values that uniquely describe data requested by the peer computers 102A-102F. Also, if requested data is not cached by one of the peer computers 102A-102F, the content server 104 will directly provide the requested data to the requesting peer computer. Additional details regarding the hardware and software utilized in the content server 104 and their operation will be described below with respect to FIGS. 2-5.

Figure 2:
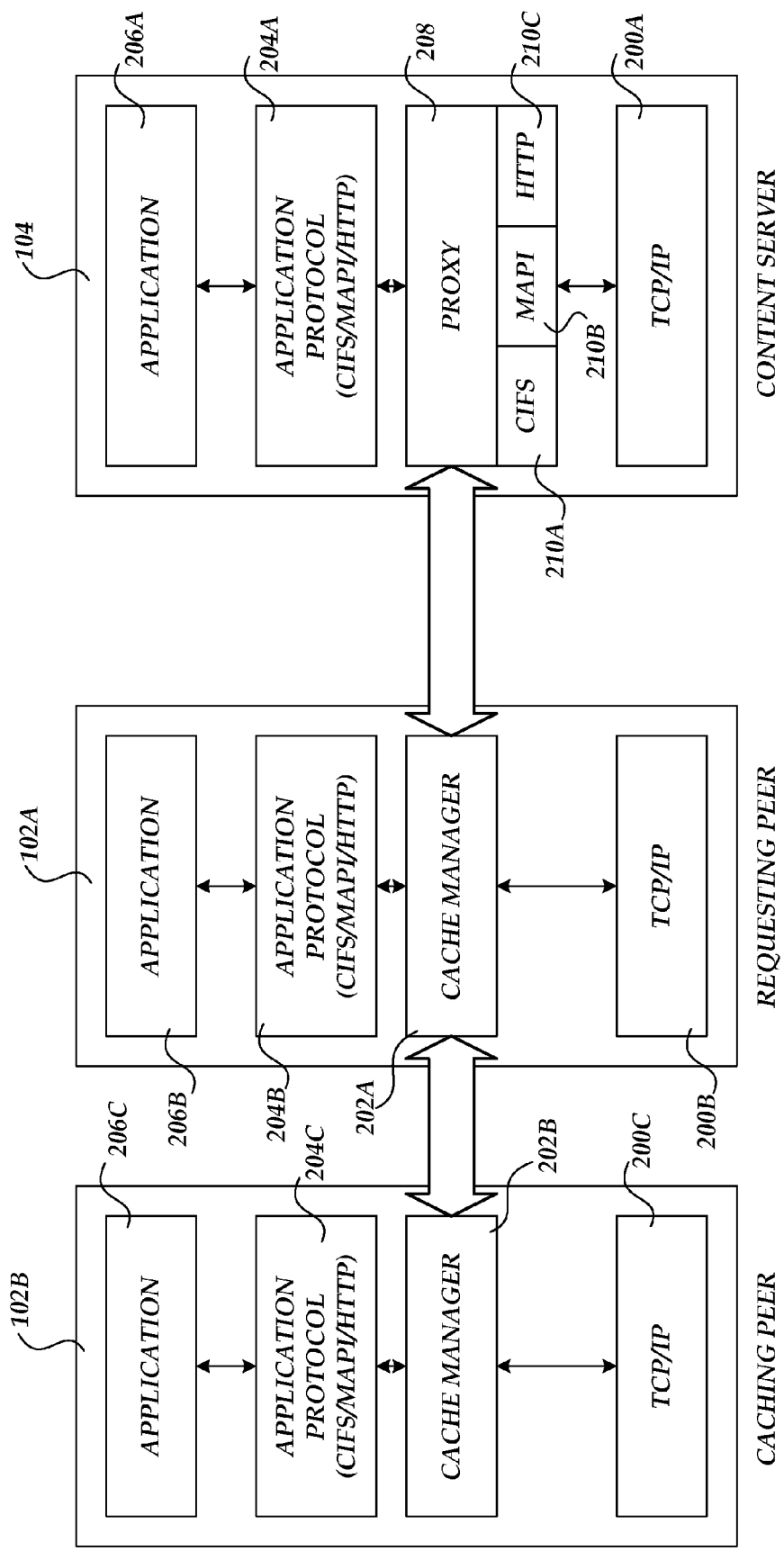
FIG. 2 is a software architecture diagram showing aspects of an illustrative network protocol stack executing on a peer computer and a network protocol stack executing on a content server computer, respectively.

Referring now to FIG. 2, additional details will be provided regarding the embodiments presented herein for securely caching data in a P2P system. In particular, FIG. 2 is a software architecture diagram illustrating aspects of the network protocol stacks utilized by the peer computers 102A-102F and the content server 104. With regard to the content server 104, an application 206A is executed by the server 104 at the top of the protocol stack. The application 206A comprises a server application for receiving and responding to requests for content stored at the server 104 or another networked location. For instance, in one implementation, the application 206A comprises a Web server application for receiving and responding to requests for Web pages and data referenced therein. Alternatively, the application 206A may comprise an e-mail server application, a file server application, or any other type of server-side application program.

The application protocol 204A executes just below the application 206A. The application protocol 204A is an application-specific protocol. For instance, where the application 206A is a Web server application, the application protocol 204A may be the Hypertext Transfer Protocol ("HTTP"). Where the application 206A is an e-mail server application, the application protocol 204A may be the Messaging Application Programming Interface ("MAPI") protocol. Where the application 206A is a file server application, the application protocol 204A may be the Common Internet File Services ("CIFS") protocol. It should be appreciated that the application protocols described herein with reference to FIG. 2 are merely illustrative and that other appropriate application protocols may be utilized to provide protocol services for other types of server-side application programs.

The server 104 also executes a proxy 208 just below the application protocol 204A in the network protocol stack. The proxy 208 utilizes one or more protocol specific shims 210A-210C that receive and respond to requests from a cache manager 202A executing on the peer computers 102A-102F. In particular, the protocol specific shims 210A-210C generate signatures, called hash values, of content downloadable from the content server 204. A hash value is the result of the application of a hash function to the requested data. In one implementation described herein, the hash function utilized by the shims. 210A-210C is a cryptographically secure one-way hash function. This implies that the hash function is collision free (i.e. different input data will not generate an identical hash) and that hash values cannot be utilized to generate the input data that generated the hash. Such hash functions are known to those skilled in the art. Additional details regarding the use of the hash values generated by the shims 210A-210C will be provided below with respect to FIGS. 3A-4B.

According to another implementation, the hash value may comprise a keyed-hash message authentication code ("HMAC") with a unique key for each block of data. In this implementation, a secret is generated and maintained by the server 104 and utilized to generate the HMAC. The secret is also communicated to each peer computer along with the HMAC. In one implementation, a given block of data always utilizes the same secret per server computer. In another implementation, the per block secret may be shared between server computers. The use of a HMAC with a unique key for each block of data prevents brute force attacks where some of the plain text may be known.

It should be appreciated that, for some protocols and applications, like CIFS for instance, a separate server may provide the functionality described herein as being performed by the protocol specific shims 210A-210C. For other protocols, this functionality may be provided by an add-on to the application 206A that utilizes the protocol. For instance, in the case of MAPI communication between a client application executing on one of the peer computers and an e-mail application executing on the content server 104, there is a protocol specific shim 210B on the server 104. A proxy executing on the peers communicates with the shim 210B to request the hash values for requested data. In one implementation, the proxy executing on the peer computers is the cache manager 202A. The operation of the shims 210A-210C and the cache manager 202A is described in greater detail below.

As also shown in FIG. 2, the Transmission Control Protocol/Internet Protocol ("TCP/IP") layer 200A sits below the proxy 208. As known in the art, the TCP/IP layer 200A implements the TCP protocol and the Internet Protocol that together guarantee reliable and in-order delivery of data from sender to receiver. Details regarding the TCP/IP layer 200A are known to those skilled in the art. It should be appreciated that the network protocol stacks illustrated in FIG. 2 for the peer computers 102A-102B and the content server 104 may include additional protocol layers not shown in FIG. 2. These protocol layers are commonly understood in the art.

FIG. 2 also illustrates aspects of the networking protocol stack utilized by the peer computers 102A-102F. In particular, FIG. 2 illustrates aspects of a peer computer 102A and a peer computer 102B. In the example shown in FIG. 2, the peer computer 102A is operating in the role of a requesting peer computer. A requesting peer computer is one of the peer computers 102A-102F that has requested data from the content server 104 or from another peer computer. In FIG. 2, the peer computer 102B is operating in the role of a caching peer computer. A caching peer computer is one of the peer computers 102A-102F that has cached data that it has made available to requesting peer computers.

It should be appreciated that each of the peer computers 102A-102F may from time to time operate as both a requesting peer computer and a caching peer computer. These roles may also be performed simultaneously. That is, at any given time, a single peer computer may act as a requesting peer computer with respect to one request and as a caching peer computer with respect to other requests. In alternative implementations, the caching functionality may be turned off for some of the peer computers 102A-102F, thereby causing these peers to only act in the role of a requesting peer computer.

The networking protocol stacks utilized by the peers 102A-102B also include the client application programs 206B-206C, respectively. These client application programs include, but are not limited to a personal information manager desktop client, a file transfer program, a Web browser, or any other type of application program. The network protocol stacks utilized by the peer computers 102A-102B provided herein also include an application protocol 204B-204C, respectively. The application protocols 204B-204C perform similar functions on the peers as those described above with respect to the content server 104. The TCP/IP layers 200B-200C of the peer computers 102A-102B, respectively, also perform similar functions as those described above with respect to the content server 104.

As mentioned briefly above, each of the peer computers 102A-102B includes a cache manager 202A-202B, respectively, as a part of its network protocol stack. The cache manager executes between the application protocol and the TCP/IP layer in the stack. The cache manager 202A executing on a requesting peer, such as the peer 102A, is operative to receive a request for data from the application protocol 204B. In response to such a request, the cache manager 202A contacts the proxy 208 and requests a hash for the requested data. Because possession of a hash value for the requested data is proof of entitlement to the requested data itself, the proxy 208 determines whether the cache manager 202A is entitled to the data. For instance, the proxy 208 may cause an ACL to be examined to determine if the peer 102A is entitled to the data. If the peer 102A is entitled to possession of the data, the proxy 208 returns the hash value for the requested data to the cache manager 202A.

Once the cache manager 202A has obtained the hash value for the requested data, the cache manager 202A transmits a broadcast request to other peer computers to determine if any other peer computers have the requested data. The broadcast request includes data sufficient to prove that the requesting peer has possession of the hash value for the requested data, without transmitting the hash value itself. The broadcast request also includes data to assist each of the peer computers in determining whether they have the requested data. Additional details regarding the data transmitted in such a request are provided below with respect to FIG. 4A.

If a peer computer has the requested data, such as the peer computer 102B in FIG. 2 for instance, the cache manager executing on the peer generates a reply to the request and transmits the reply to the requesting peer. The reply includes data sufficient to prove that the caching peer is also in possession of the hash value for the requested data, and the requested data itself, without transmitting the hash value. Additional details regarding the data transmitted in the reply generated by the caching peer are provided below with respect to FIG. 4B.

When the requesting peer receives a reply from one of the caching peer computers, the requesting peer verifies that the reply is valid. If so, the requesting peer establishes a secure connection to the caching peer and retrieves the requested data. If no caching peers provide a reply to the request, the cache manager 202A of the requesting peer contacts the proxy 208 to obtain the requested data directly from the content server 104. Once the requesting peer has the requested data, the data is cached at the requesting peer for use in responding to requests from other peers for the data. It should be appreciated that this process may be repeated many times to obtain a single data file. For instance, the process may be repeated for each block or sector of a file until the entire file has been obtained. Additional details regarding this process are provided below with respect to FIGS. 3A-4B.

Figure 3A:
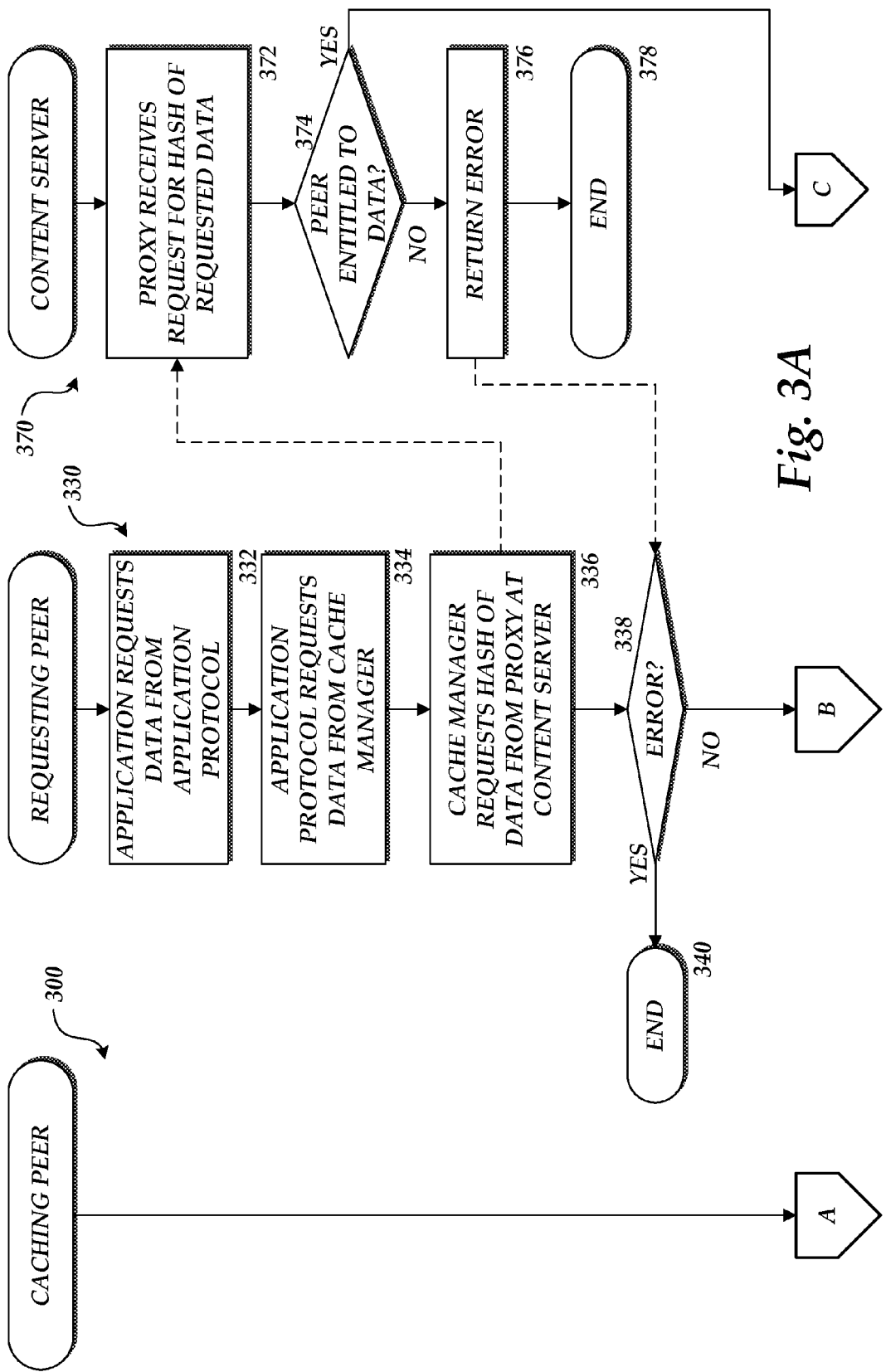
Figure 3B:
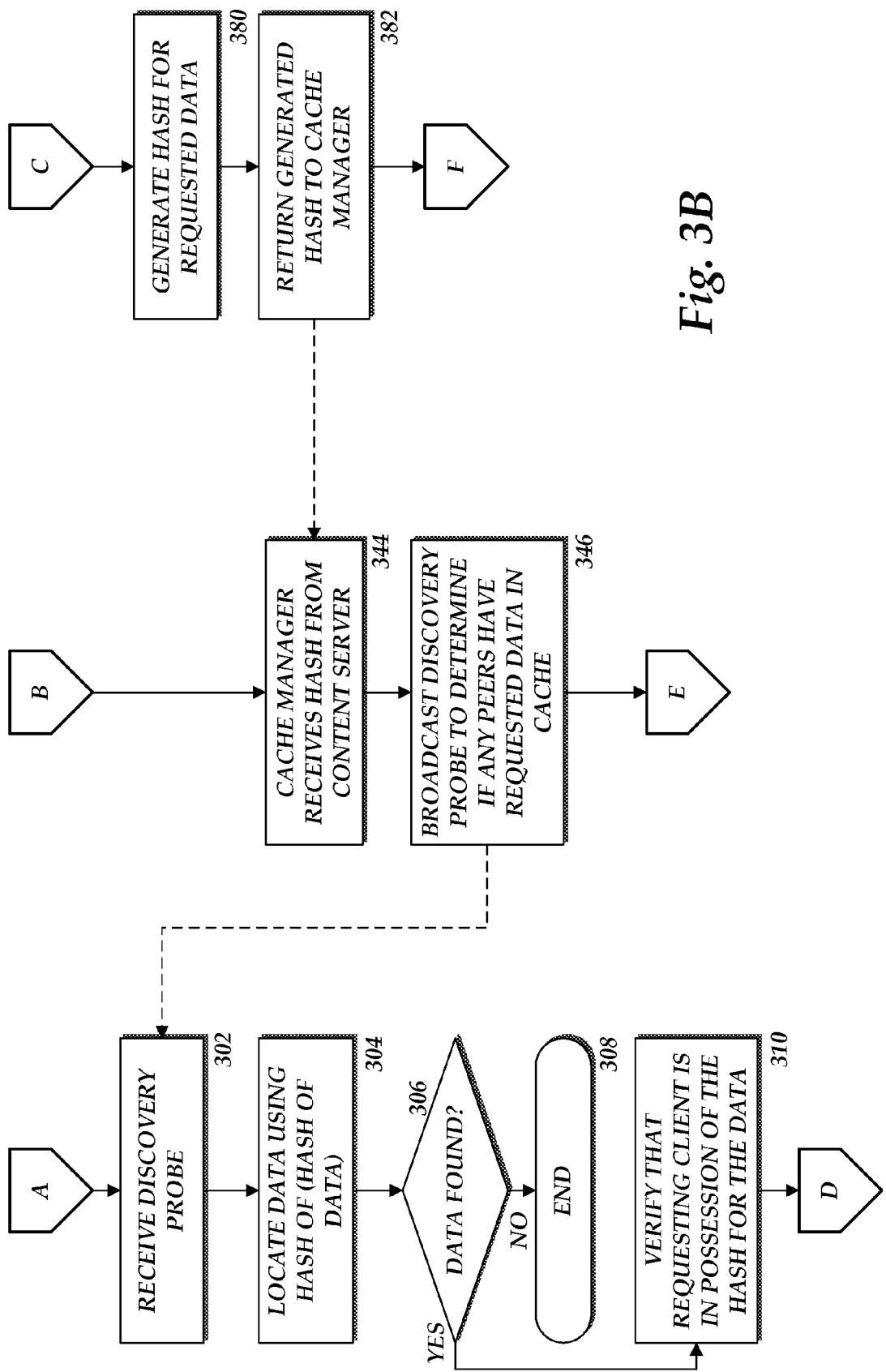

FIGS. 3A-3C are flow diagrams illustrating the routines 300, 330, and 370 performed by a caching peer computer, a requesting peer computer, and the content server 104, respectively. With respect to FIGS. 3A-3C, the peer computer 102A will be referred to as the requesting peer and the peer computer 102B will be referred to as the caching peer. The routines 300, 330, and 370 will also be described with reference to the various software components described above with respect to FIG. 2.

It should be appreciated that the logical operations described with reference to FIGS. 3A-3C are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 330 begins at operation 332, where the application 206B executing on the requesting peer 102A requests data from the application protocol 204B. In turn, the application protocol 204B requests the data from the cache manager 202A at operation 334. In response to receiving such a request, the cache manager 202A requests a hash value for the requested data from the appropriate protocol specific shim executing on the content server 104. This occurs at operation 336.

The routine 370 begins at operation 372, where the proxy 208 executing on the content server 104 receives the request for the hash value from the cache manager 202A. From operation 372, the routine 370 continues to operation 374, where the content server 104 determines whether the requesting peer 102A is entitled to the requested data. This may occur, for instance, through the examination of an ACL or other type of data structure defining access rights for the peer computers or their users. If the requesting peer 102A is entitled to the data, the routine 370 continues from decision operation 374 to operation 380, shown in FIG. 3B and described below. If the requesting peer 102A is not entitled to the data, the routine 370 continues from operation 374 to operation 376, where an error is returned to the requesting peer 102A. The error is processed by the requesting peer 102A at operations 338 and 340. From operation 376, the routine 370 continues to operation 378, where it ends.

At operation 380, the proxy 208 and the appropriate protocol specific shim 210 generate the hash value for the requested data using the hash function described above. Once the hash value has been generated, the content server 104 returns the hash value to the cache manager 202A of the requesting peer 102A. The routine 370 then continues to operations 384 and 386, described below.

At operation 344 of the routine 330, the requesting peer 102A receives the hash value from the content server 104. The routine 330 then continues to operation 346, where the requesting peer 102A transmits a broadcast message to the other peer computers 102A-102F to determine if any of the peer computers 102A-102F has the requested data. As discussed briefly above, the broadcast message includes data sufficient to prove that the requesting peer 102A has the hash value without transmitting the hash value itself in the request.

Figure 4A:
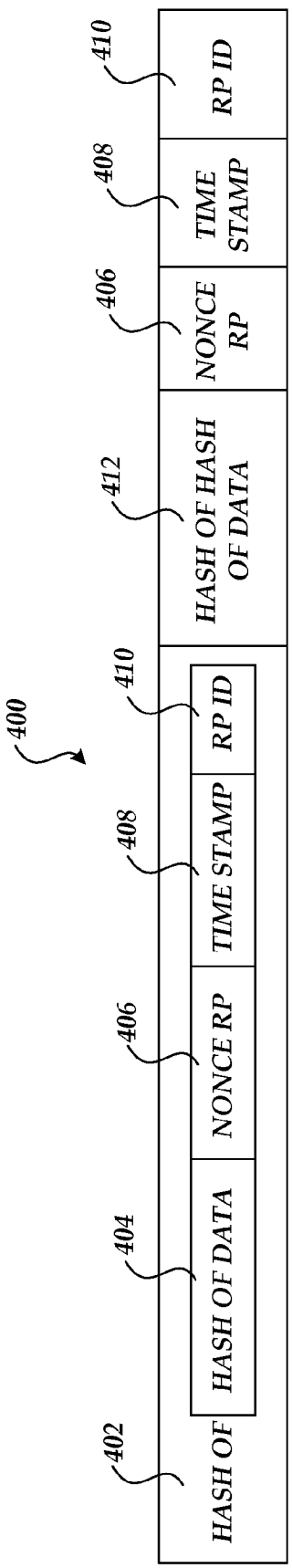
FIGS. 4A-4B are data structure diagrams illustrating the contents of a request for data and a reply to the request utilized in one implementation discussed herein, respectively.

According to one implementation, the data structure 400 shown in FIG. 4A is transmitted in the broadcast message. As shown in FIG. 4A, the data structure 400 includes a hash 402 of the concatenation of the hash value 404 for the requested data received from the content server 104, a number used once ("NONCE") 406 for the requesting peer 102A, a time stamp 408, and an identifier 410 for the requesting peer. A NONCE comprises random data and is utilized to assist in the prevention of a replay attack and to match replies to the broadcast request. The time stamp 408 is also included to assist in the prevention of a replay attack. The identifier 410 comprises a unique identifier for the requesting peer 102A, such as an IP address or fully qualified domain name for the requesting peer 102A. The broadcast request also includes a hash of the hash for the requested data 412, the NONCE 406 for the requesting peer 102A, the time stamp 408, and the identifier 410 for the requesting peer 102A. As will be described in detail below, the caching peer 102B utilizes the contents of the data structure 400 to determine whether the requesting peer 102A is in possession of the hash value for the requested data without requiring the hash value to be sent in the request.

According to one implementation, the hash of the hash for the requested data 412 may comprise a hash of the hash concatenated with a constant string. For instance, the constant string "MS_P2P_Caching" may be concatenated with the hash. The peer computers may index hash values generated in this manner in order to permit the quick determination as to whether they have the block in question. In the embodiment wherein a HMAC is utilized, the hash of the hash for the requested data 412 will utilize the secret obtained from the server 104 instead of the constant string.

The routine 300 begins at operation 302, where the caching peer 102B receives the broadcast message transmitted by the requesting peer 102A. The routine 300 then continues to operation 304, where the caching peer 102B attempts to locate the requested data using the hash of the hash for the requested data 412 provided in the broadcast request. This is possible because, in one implementation, the caching peer 102B indexes cached data using the hash of the hash value for the stored data. In this manner, a quick determination can be made by each caching peer 102B as to whether it actually has the requested data.

If, at operation 306, the caching peer 102B determines that it does not have the requested data, the routine 300 continues to operation 308 where it ends. If the caching peer 102B determines that it has the requested data, the routine 300 continues from decision operation 306 to operation 310. At operation 310, the caching peer 102B verifies that the requesting peer is actually in possession of the hash value for the requested data. In one implementation, this is performed by generating a hash of the hash of the requested data (which the caching peer 102B will have if it has the requested data), the NONCE 406 for the requesting peer 102A, the time stamp 408, and the identifier 410 for the requesting peer 102A. The resulting value is then compared to the hash 402 transmitted by the requesting peer 102A in the broadcast request. If the two values match, then the requesting peer 102A is actually in possession of the hash value for the requested data and is entitled to receive the data itself from the caching peer 102B.

If the caching peer 102B cannot verify that the requesting peer 102A is in possession of the hash value for the requested data, the routine 300 continues from operation 312 to operation 314 where it ends. If the caching peer 102B verifies that the requesting peer 102A is in possession of the hash value for the requested data, the routine 300 continues from operation 312 to operation 316. At operation 316, the caching peer 102B generates a reply to the requesting peer 102A. The reply includes data sufficient to prove possession of the requested data by the caching peer computer without transmitting the hash value for the requested data.

Figure 4B:
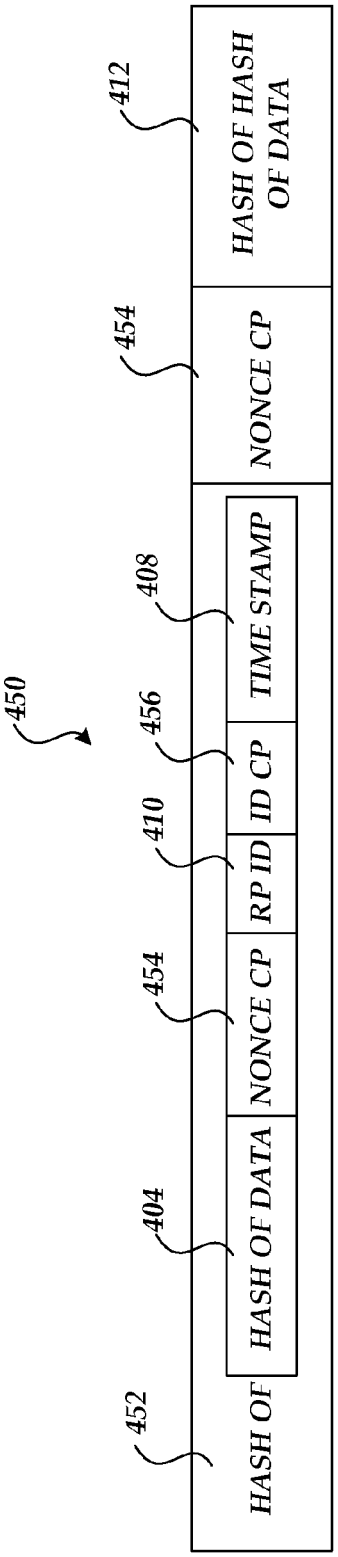

According to one implementation, the data structure 450 shown in FIG. 4B is transmitted in the reply. As shown in FIG. 4B, the data structure 450 includes a hash 452 of the hash value 404 for the requested data, a NONCE 454 generated by the caching peer 102B, the identifier 410 for the requesting peer 102A, an identifier 456 for the caching peer 102B, and the time stamp 408. The data structure 450 also contains the hash 412 of the hash value for the requested data concatenated with the NONCE 454 of the caching peer 102B. As will be described in greater detail below, the data stored in the data structure 450 is utilized by the requesting peer 102A to verify that the caching peer 102B actually has the requested data.

From operation 346, the routine 330 continues to operation 348, where the cache manager 202A determines if any replies were received to the broadcast message. If no replies were received, then none of the peer computers has the requested data cached. Accordingly, in this case, the routine 330 continues from operation 348 to operation 350, where a secure connection is established with the content server 104 and the requested data is retrieved from the content server 104 directly. The content server 104 transmits the data to the requesting peer 102A at operation 384 of the routine 370. When the requesting peer 102A receives the data, the routine 330 continues to operation 358, where the cache manager 202A stores the requested data and indexes the data utilizing a hash of the hash value for the requested data. In this manner, the data is indexed and cached for use in responding to requests for the data from other peers. The cache manager 202A also returns the requested data to the application 206B. The routine 330 then continues to operation 360, where it ends.

If, at operation 348, the cache manager 202A determines that a reply was received to the broadcast message, the routine 330 continues from operation 348 to operation 352, where the reply is received. It should be appreciated that multiple replies may be received and processed in the manner described herein. Moreover, when multiple replies are received, the requesting peer 102A may choose which of the responding caching peers to retrieve the data from based on a variety of factors, including which of the caching peers has the most data, the speed or latency of the network connection to the caching peers, and other factors.

At operation 354 of the routine 330, the requesting peer 102A determines whether a valid reply was received by the caching peer 102B. In one implementation, this is accomplished by generating a hash of the hash value 404 for the requested data, the NONCE 454 generated by the caching peer 102A, the identifier 410 for the requesting peer 102A, the identifier 456 for the caching peer 102B, and the time stamp 408. The generated hash is then compared to the hash 452 transmitted in the reply. If the two values match, the reply is valid and the requested data may be retrieved from the caching peer 102B. Accordingly, if the requesting peer 102A determines that the reply is invalid, the routine 330 branches from operation 354 to operation 360, where it ends. If the reply is valid, the routine 330 continues to operation 356.

At operation 356, the requesting peer 102A establishes a secure network connection to the caching peer 102B, such as for instance through the use of a Secure Sockets Layer ("SSL") connection. Also at operation 356, the requesting peer 102A retrieves the requested data from the caching peer 102B. In particular, in the embodiment where a HMAC is utilized, the requesting peer 102A transmits the hash of the hash of the data concatenated with the secret to the caching peer 102B. The per block secret must also be sent to the caching peer 102B. The caching peer 102B then utilizes the secret to verify the authorization of the requesting peer 102A. If the authorization of the requesting peer 102A is verified, the caching peer 102B establishes the connection and transmits the requested data at operation 320 of the routine 300. Once the requested data has been received at the requesting peer 102A, the data is indexed, cached, and returned to the application 206B at operation 358. The routine 330 then continues to operation 360, where it ends.

Figure 5:
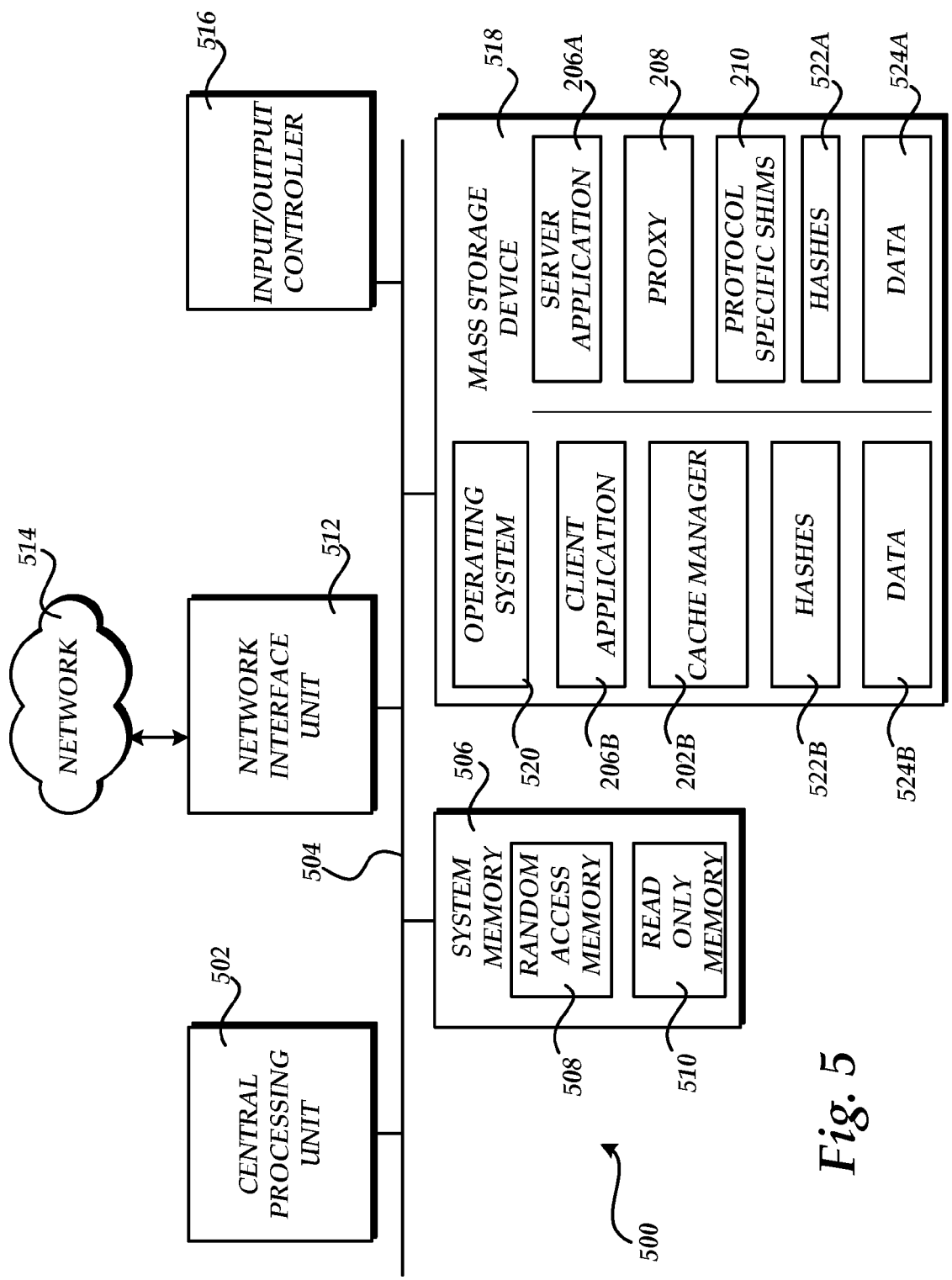
FIG. 5 is a computer architecture diagram showing a computer architecture suitable for implementing the various computer systems described herein.

Referring now to FIG. 5, an illustrative computer architecture for a computer 500 utilized in the various embodiments presented herein will be discussed. The computer architecture shown in FIG. 5 illustrates a conventional desktop, laptop computer, handheld, or server computer, and may be utilized to embody the peer computers 102A-102F or the content server 104, described above. The computer architecture shown in FIG. 5 includes a central processing unit 502 ("CPU"), a system memory 506, including a random access memory 508 ("RAM") and a read-only memory ("ROM") 510, and a system bus 504 that couples the memory to the CPU 502. A basic input/output system containing the basic routines that help to transfer information between elements within the computer 500, such as during startup, is stored in the ROM 510. The computer 500 further includes a mass storage device 518 for storing an operating system 520, application programs, and other program modules, which will be described in greater detail below.

The mass storage device 518 is connected to the CPU 502 through a mass storage controller (not shown) connected to the bus 504. The mass storage device 518 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed by the computer 500.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 514, such as the WAN described above with respect to FIG. 1. The computer 500 may connect to the network 514 through a network interface unit 512 connected to the bus 504. It should be appreciated that the network interface unit 512 may also be utilized to connect to other types of networks and remote computer systems. The computer 500 may also include an input/output controller 516 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 518 and RAM 508 of the computer 500, including an operating system 520 suitable for controlling the operation of a networked computer, such as the WINDOWS XP or WINDOWS VISTA operating systems from MICROSOFT CORPORATION of Redmond, Wash. The mass storage device 518 and RAM 508 may also store one or more program modules. In particular, the mass storage device 518 and the RAM 508 may store the software components illustrated in and described above with reference to FIG. 2, such as the client application 206B, the cache manager 202B, the hashes 522B, and the data 524B received from other peers or the content server 104. In the case of the content server 104, the mass storage device 518 may be utilized to store the server application 206A, the proxy 208, the protocol specific shims 210, the hashes 522A, and the data 524A. Other data and program modules may also be stored on the mass storage device 518 of the peers 102A-102F and the content server 104.

Based on the foregoing, it should be appreciated that systems, methods, apparatus, data structures, and computer-readable media for secure P2P caching are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for securely retrieving data cached in a peer-to-peer network comprising two or more networked peer computers, the method comprising:

transmitting a broadcast request for the requested data on the network, the broadcast request comprising a hash of the hash value for the requested data, random data generated by a requesting peer computer, a timestamp, an identifier for the requesting peer computer, and a hash of the hash value for the requested data concatenated with the random data generated by the requesting peer, the timestamp, and the identifier for the requesting peer computer;

receiving a reply to the broadcast request from a caching peer computer, the reply comprising data proving possession of the requested data by the caching peer computer; and in response to receiving the reply, receiving the requested data from the caching peer computer.

2. The method of claim 1, further comprising prior to transmitting the broadcast request:
   transmitting a request to a server computer for the hash value for the requested data; and
   receiving the hash value for the requested data from the server computer.

3. The method of claim 2, further comprising retrieving the requested data from the server computer in response to failing to receive a reply to the broadcast request from any of the peer computers.

4. The method of claim 3, further comprising in response to retrieving the requested data from the caching peer computer:
   storing the requested data; and
   indexing the stored requested data using a hash of the hash value for the requested data concatenated with a string.

5. The method of claim 4, wherein receiving the requested data from the caching peer computer comprises:
   establishing a secure network connection to the caching peer computer; and
   receiving the requested data from the caching peer computer over the secure network connection.

6. A computer-readable medium having computer-executable instructions stored thereon which, when executed by a computer, will cause the computer to perform the method of claim 1.

7. A computer-controlled apparatus operative to perform the method of claim 1.

8. A computer-implemented method for securely providing data cached in a peer-to-peer network comprising two or more networked peer computers, the method comprising:
   receiving a broadcast request for the requested data at a caching peer computer, the broadcast request comprising a hash of the hash value for the requested data, random data generated by a requesting peer computer, a timestamp, an identifier for the requesting peer computer, and a hash of the hash value for the requested data concatenated with the random data generated by the requesting peer, the timestamp, and the identifier for the requesting peer;
   in response to receiving the broadcast request, determining whether the caching peer computer has the requested data;
   in response to determining that the caching peer computer has the requested data, transmitting a reply to the broadcast request, the reply comprising data proving possession of the requested data by the caching peer computer; and
   transmitting the requested data to the requesting peer computer.

9. The method of claim 8, wherein determining whether the caching peer computer has the requested data comprises:
   searching an index stored at the caching peer computer for the hash of the hash value for the requested data; and
   in response to locating the hash of the hash value for the requested data in the index, determining that the caching computer has the requested data.

10. The method of claim 9, wherein the data of the reply comprises random data generated by the caching peer computer, a hash of the hash value for the requested data, and a hash of the hash value for the requested data concatenated with the random data generated by the caching peer computer, the identifier for the requesting peer computer, an identifier for the caching peer computer, and the timestamp.

11. The method of claim 10, wherein transmitting the requested data to the requesting peer computer comprises:
   establishing a secure network connection with the requesting peer computer; and
   transmitting the requested data to the requesting peer computer over the secure network connection.

12. A computer-readable medium having computer-executable instructions stored thereon which, when executed by a computer, will cause the computer to perform the method of claim 8.

13. A computer-implemented method for caching data in a peer-to-peer network comprising two or more networked peer computers, the method comprising:
   providing a cache manager for execution in conjunction with a networking protocol stack at each of the peer computers, the cache manager operative to receive a request for data from an application protocol, and, in response to the request for data operative to transmit a broadcast request comprising data proving possession of a hash value for the requested data to the peer computers, to receive a reply to the broadcast request comprising data proving possession of the requested data by a caching peer computer, to receive the requested data from the caching peer computer in response to receiving the reply, and to store the received requested data for use in responding to requests for the data,
   the cache manager further operative to receive a broadcast request comprising data proving possession of a hash of the requested data by a requesting peer computer, to determine whether a caching peer computer has the requested data in response to receiving the broadcast request, to transmit a reply to the broadcast request comprising data proving possession of the requested data by the caching peer computer, and to transmit the requested data to the requesting peer computer.

14. A computer-readable medium having computer-executable instructions stored thereon which, when executed by a computer, will cause the computer to perform the method of claim 13.

15. A method for securely retrieving data cached in a peer-to-peer network comprising two or more networked peer computers, the method comprising:
   transmitting a broadcast request for the requested data on the network, the broadcast request comprising data proving possession of a hash value for the requested data to the peer computers;
   receiving a reply to the broadcast request from a caching peer computer, the reply comprising random data generated by the caching peer computer, a hash of the hash value for the requested data, and a hash of the hash value for the requested data concatenated with the random data generated by the caching peer computer, an identifier for a requesting peer computer, an identifier for a caching peer computer, and a timestamp; and
   in response to receiving the reply, receiving the requested data from the caching peer computer.

16. The method of claim 15, further comprising prior to transmitting the broadcast request:
   transmitting a request to a server computer for the hash value for the requested data; and
   receiving the hash value for the requested data from the server computer.

17. The method of claim 16, further comprising retrieving the requested data from the server computer in response to failing to receive a reply to the broadcast request from any of the peer computers.

18. The method of claim 17, further comprising in response to retrieving the requested data from the caching peer computer:

storing the requested data; and indexing the stored requested data using a hash of the hash value for the requested data concatenated with a string.

19. The method of claim 18, wherein receiving the requested data from the caching peer computer comprises:

establishing a secure network connection to the caching peer computer; and receiving the requested data from the caching peer computer over the secure network connection.

20. A system for securely retrieving data cached in a peer-to-peer network comprising two or more networked peer computers, the system comprising:

a requesting peer computer configured to transmit a broadcast request for requested data on the network, the broadcast request comprising a hash of a hash value for the requested data, random data generated by the requesting peer computer, a timestamp, an identifier for the requesting peer computer, and a hash of the hash value for the requested data concatenated with the random data generated by the requesting peer, the timestamp, and the identifier for the requesting peer computer, to receive a reply to the broadcast request from a caching peer computer, the reply comprising data proving possession of the requested data by the caching peer computer and, in response to receiving the reply, to receive the requested data from the caching peer computer; and a caching peer computer configured to receive the broadcast request for the requested data, in response to receiving the broadcast request, to determining whether the caching peer computer has the requested data and, in response to determining that the caching peer computer has the requested data, to transmit a reply to the broadcast request, the reply comprising random data generated by the caching peer computer, a hash of the hash value for the requested data, and a hash of the hash value for the requested data concatenated with the random data generated by the caching peer computer, an identifier for the requesting peer computer, an identifier for the caching peer computer, and a timestamp, and to transmit the requested data to the requesting peer computer.

* * * * *